E. H. WAUGH.
PINCERS FOR FISH BUTCHERING MACHINES.
APPLICATION FILED MAR. 31, 1919.
1,360,064.
Patented Nov. 23, 1920.
2 SHEETS—SHEET 1.
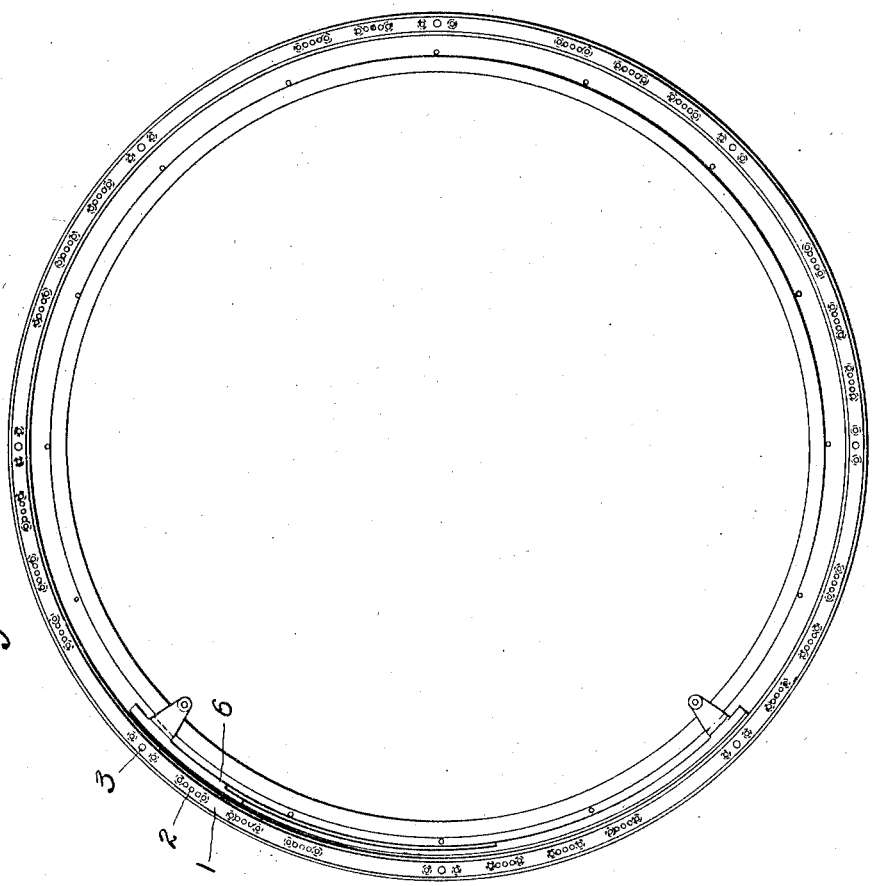
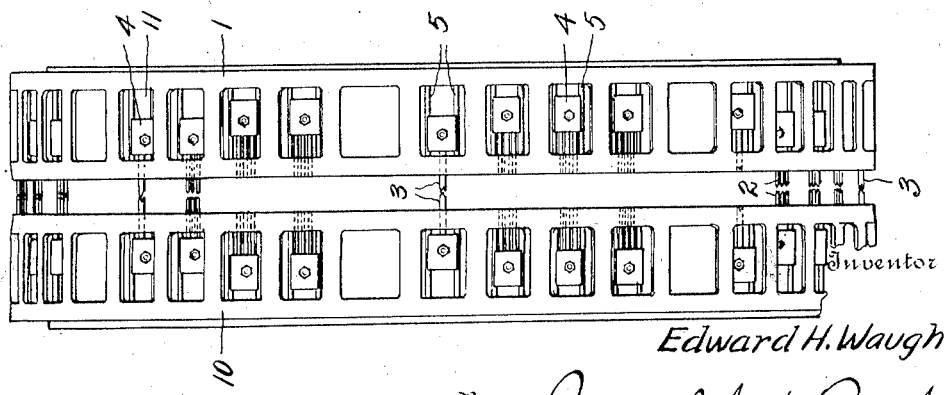
Edward H. Waugh

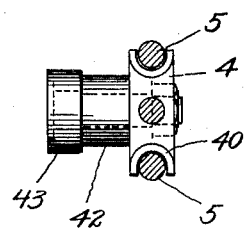
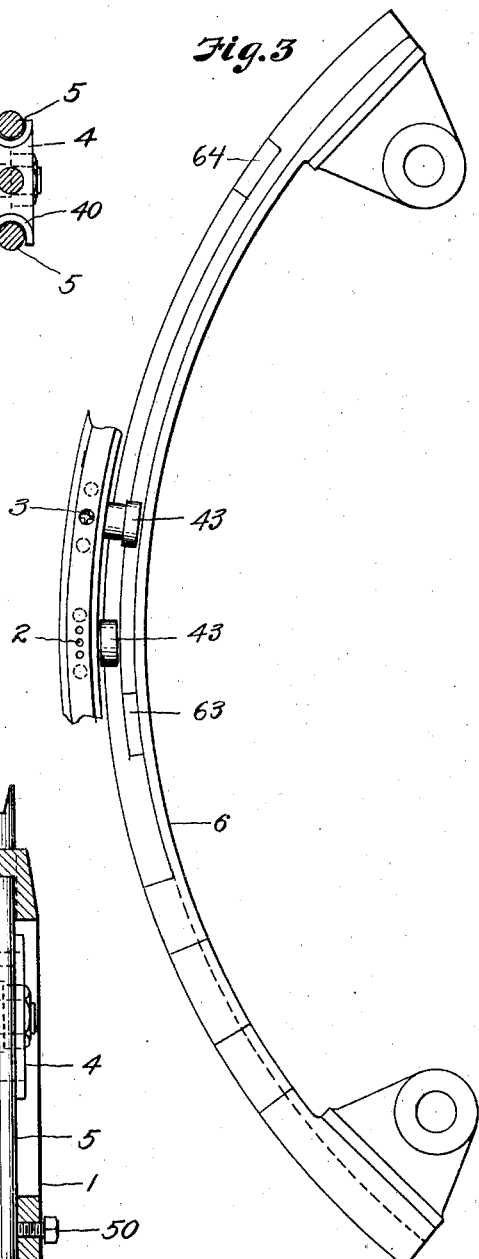
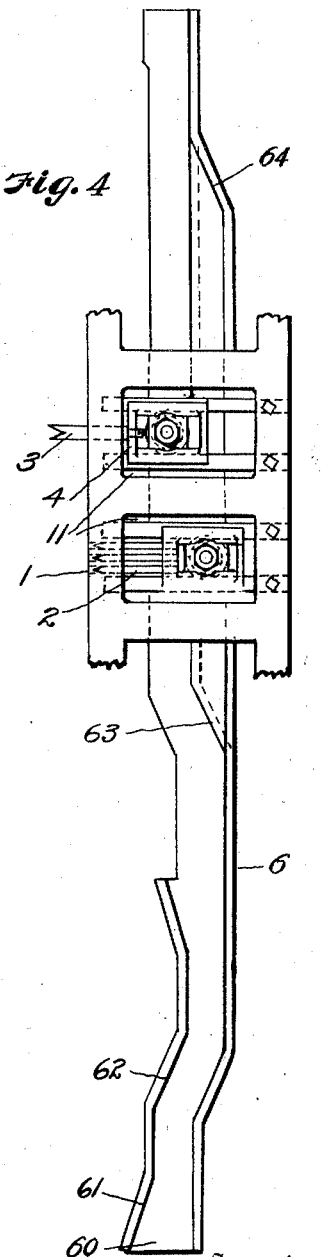
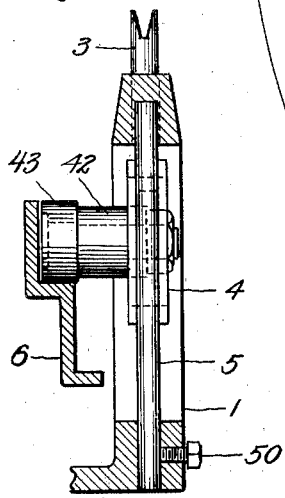

UNITED STATES PATENT OFFICE.

EDWARD H. WAUGH, OF SEATTLE, WASHINGTON, ASSIGNOR TO SMITH CANNERY MACHINES CO., OF SEATTLE, WASHINGTON, A CORPORATION OF WASHINGTON.

PINCERS FOR FISH-BUTCHERING MACHINES.

1,360,064. Specification of Letters Patent. Patented Nov. 23, 1920.

Application filed March 31, 1919. Serial No. 286,477.

*To all whom it may concern:*

Be it known that I, EDWARD H. WAUGH, a citizen of the United States, and resident of the city of Seattle, county of King, and State of Washington, have invented certain new and useful Improvements in Pincers for Fish-Butchering Machines, of which the following is a specification.

My invention relates to fish cleaning machines and consists of certain improvements in the manner of mounting, supporting and operating the fish gripping needles or pins.

The object of my invention is to provide a design for the fish gripping or holding mechanisms which will be superior in construction, have greater durability and strength, and such that it may be more easily inspected, adjusted and removed, and whereby the wear will both be reduced in amount and such as occurs will not interfere seriously with the operation of the parts.

The features of my invention which I deem to be new and upon which I wish to secure a patent will be herein set forth and then defined by the claims.

The drawings accompanying this show the construction which I now prefer to use.

Figure 1 is a side elevation of the rotative fish-carrying rings.

Fig. 2 is an outer or face view of these rings, showing their relationship to each other and to the fish holding pins or needles.

Fig. 3 is a side view, on an enlarged scale, of the cam tracks, or bars, which are used to actuate the fish holding needles, showing also a short section of the rotative rings.

Fig. 4 is a face view of the parts about the same as are shown in the side views in Fig. 3.

Fig. 5 is a cross section through one of these rotative rings showing the pin holding and operating mechanisms.

Fig. 6 is a cross section through the block which carries the fish gripping pins, together with the guide members.

My invention is intended for application to fish cleaning means of the type which are shown in the two patents to E. A. Smith, No. 998129, of July 18, 1911, and 1034525 of August 6, 1912. This invention does not relate to the parts of this machine which are used for performing various operations upon the fish, such as slitting, cleaning and removing of the fins, but is confined to the mechanism by which the fish is gripped and held while being conveyed through a definite path in order to be operated upon by the other mechanisms.

In the drawings, 1 and 10 represent two rings which are supported in the frame of the machine, so as to be rotatable about the same axis and turned so as to move synchronously. These are spaced a short distance apart, as is clearly indicated in Fig. 2, thus providing a space in which the body of the fish is laid and held, while being operated upon by other parts of the apparatus. The fish holding means which have been employed consist of a series of needles or pins, which are projected from the two rings into the space between them in which the fish has been placed. In my present device, this same principle of operation is employed.

My invention relates to improvements in the construction of these parts which engage the fish to hold it.

In my present invention the fish holding and reciprocating needles 3, are those which are used singly and which are designed to engage the fish adjacent the tail end thereof and which carry the fish upward, so as to lay the body of the fish in the space between the rings 1 and 10. The needles 2 are the needles which are generally arranged in groups of two or three which engage the body of the fish after it has been laid in the space between the two rings.

I provide a common supporting means for both of these groups of needles. The fish engaging needles of both types are secured to blocks 4, which blocks are each mounted within one of a series of recesses 11 formed in the body of the rings. The side edges of blocks 4 are provided with guide ways, as the grooves 40, which engage guides, as the bars or rods 5, which are secured to or form a part of the ring. I prefer to make these guides 5 as separate bars which may be readily removed when desired and which may also be made of a material which will better stand the wear of continued use. As shown these bars 5 are round steel rods. They are inserted in holes formed in the ring from the outer edge thereof, and secured in place in any suitable manner, as by the use of set screws 50. It is thus possible to readily remove the rod 5 and thus to free the blocks 4 which carry the fish engaging needles.

The needles 3, in accordance with the former practice, are made so as to be free to turn upon their axis. They are engaged with the fish while the fish is occupying a position which is radial with respect to the ring and as the rings turn the fish swings against the outside of the ring and into the space between the two. The needles 2 are shown as arranged in groups of three which are secured to each of the blocks 4. Both the needles 2 and 3 pass through holes formed in the inner bar of the rings 1 and 10. These holes may serve as an additional support and guides for the needles.

Each of the blocks 4 is provided with an offset arm or boss 42 upon which is mounted a cam roller 43. These project inward from the ring and are designed to engage cam tracks which are fixedly positioned and extend over certain segments of the circular path of said rollers 43. In Fig. 5 these cam tracks are shown in cross section while in Fig. 4 they are shown in outer face view and in Fig. 3 in side view.

The cam rollers which are secured to those blocks which carry the single needles 3, are set at a slightly different distance from the center of the ring than are the cam rollers which are secured to those blocks 4 to which the needles 2 are secured. The reason for this is that the time of reciprocation of these needles is somewhat different. The needles 3 which engage the tail of the fish must be projected so as to engage the fish somewhat earlier than the needles 2.

These cam tracks need not be extended around the entire circle but may be confined to those segments of the circle in which the reciprocating movement occurs. In the device as shown in Fig. 4 the end 60 of the cam tracks 6, is the one which is first engaged by the rollers. The inclined surfaces 61 and 62 engage these cam rollers to withdraw the needles and to release the fish which has been operated upon. The surface 63 engages the cam roller 43 which is carried by the blocks 4 which carry the needles 3 by which the tail of the fish is engaged. This causes projection of these needles in advance of the projection of the needles 2. In consequence, the fish is engaged near its tail and swung upward by the rotation of the rings, so as to swing the body of the fish into the space between the two rings 1 and 10.

The cam rollers 43 carried by the other blocks, namely those which carry the needles 2, are not acted upon to project the needles until they reach the point 64. This is due to the fact that the two surfaces 63 and 64 are at different distances from the center of rotation and to the different projection of the cam roller 43 from the respective blocks 4. When this other set of cam rollers reaches the point 64, they cause projection of the other blocks 4 and the needles 2 so as to engage the body of the fish at intervals along its length. The cam tracks may be discontinued shortly after this step has been performed.

By the type of construction described, the needles 2 and 3 are more firmly supported and the wear which occurs is greatly reduced in amount and occurs upon parts which are of small size and which may be cheaply renewed. The parts may thus be readily maintained in perfect working condition and free of slack. Both the blocks 4 and the bars 5 may be readily removed and renewed and therefore the parts be kept in perfect condition.

By this expedient reliance for accuracy in position of the needles and their operation is not based upon the bearing of the pins in the body of the rings 1 and 10, but rather upon attached members of small size which may be cheaply and easily replaced. The bearing surfaces may thus be made amply large to reduce the amount of wear and increase the firmness of the support.

What I claim as my invention is:

1. In a machine of the character described, in combination, a traveling fish carrier having transversely extending guides, needle carrying blocks mounted to reciprocate on said guides, fish holding needles carried by said blocks, and means for actuating said blocks at predetermined times.

2. In a machine of the character described, in combination, a movable fish carrier, guides therefor, needle blocks each having fish engaging needles secured thereto, guides for said blocks carried by the fish carrier, stationary cam ways paralleling the fish carrier, and cam tappets carried by the needle blocks.

3. In a machine of the character described, in combination, a pair of opposed movable fish carriers, needle blocks having guiding engagement with the fish carriers for movement transversely of the direction of movement of said carriers, needles carried by said blocks, and means for automatically reciprocating said needle blocks at predetermined points.

4. In a mechanism of the character described, a pair of slightly separated carrier rings and means for rotating them about a common axis, needle blocks having sliding engagement with said rings for movement toward and from the opposite ring, fish engaging and holding needles carried by said blocks to be projected into and withdrawn from the space between said rings, and means for moving the needle blocks at predetermined points in their path of travel.

5. In a machine of the character described, a pair of opposed and rotatively mounted rings having a series of transversely extending openings therein, transversely extending guide bars arranged in pairs in said openings, blocks mounted to reciprocate on said guide bars, fish holding pins secured to said blocks, a cam engaging arm carried by each block and fixed cam ways positioned to be engaged by said arms.

6. In a machine of the character described, a pair of rings rotatively mounted in spaced apart and opposed relation, said rings having a series of openings extending between their inner and outer surfaces, guide bars extending along the opposite margins of said openings in directions parallel with the axis of the rings, needle carrying blocks grooved on their edges to have guiding engagement with said bars, fish holding pins carried by and projecting from one end of said blocks toward the other ring, and cam tracks positioned to engage said blocks to project the said pins into the space between the rings at predetermined points in the path of their travel.

7. In a device of the character described, the combination with a movable fish carrier and fish holding pins, of blocks to which said pins are secured and guideways for said blocks separate from and removably secured to the fish carrier.

8. In a device of the character described, the combination with a movable fish carrier having openings extending through it, guide ways extending along two opposite sides of said opening, one of said guide ways being a removable bar, a block having opposite edges fitting said guide ways, fish holding pins secured to and projecting from one end of said block and parallel to the guide ways, and stationary means engaging said blocks to reciprocate them when passing.

9. In a device of the character described, the combination with two separated and opposed movable fish carriers, guide ways extending in pairs transversely of the direction of movement of the carriers, one guideway of each pair being a removable bar, blocks mounted to slide on said guideways, fish holding pins carried by said blocks, and projectable into the space between the carriers, a cam roller carried by each block and fixed cam bars adapted to engage said cam rollers to reciprocate said blocks.

10. In a machine of the character described, a pair of rotative rings separated slightly in an axial direction, guide ways extending transversely of said rings and disposed in pairs, blocks mounted to slide on said guide ways, fish holding needles carried by said blocks, said rotative rings having holes for the passage of said needles, and means for reciprocating said blocks at predetermined times.

11. In a machine of the character described, two rings mounted to turn about a common axis, guide bars removably carried by said rings and extending transversely thereof, blocks having grooved edges fitting over said guide bars to move lengthwise thereof, fish holding needles secured to said blocks and adapted to be projected toward the opposite ring, the ring having holes for the passage of said needles, a cam roller carried by each block at the inner side of the rings, and cam bars fixed to engage said cam rollers in passing to reciprocate said blocks to thereby engage and disengage the fish.

Signed at Seattle, Washington, this 21st day of March, 1919.

EDWARD H. WAUGH.